United States Patent
Schmidt et al.

(10) Patent No.: US 6,652,157 B2
(45) Date of Patent: Nov. 25, 2003

(54) PLUG CONNECTION FOR OPTICAL WAVEGUIDES

(75) Inventors: Werner Schmidt, Halver (DE); Jürgen Bohn, Lüdenscheid (DE)

(73) Assignee: ESCHA Bauelemente GmbH, Halver (DE)

( * ) Notice: Subject to any disclaimer, the term of this patent is extended or adjusted under 35 U.S.C. 154(b) by 0 days.

(21) Appl. No.: 10/155,871

(22) Filed: May 24, 2002

(65) Prior Publication Data

US 2003/0002811 A1 Jan. 2, 2003

(30) Foreign Application Priority Data

Jun. 1, 2001 (DE) .......................... 101 26 659

(51) Int. Cl.[7] ................................ G02B 6/36
(52) U.S. Cl. ............................. 385/88; 385/69; 385/86; 385/84
(58) Field of Search ............................... 385/88, 92–94, 385/55, 56, 58, 60, 62, 66, 69, 70, 84, 86, 87

(56) References Cited

U.S. PATENT DOCUMENTS

| | | | |
|---|---|---|---|
| 4,168,109 A | * 9/1979 | Dumire | 385/60 |
| 4,268,115 A | * 5/1981 | Slemon et al. | 385/88 |
| 5,121,455 A | * 6/1992 | Palecek | 385/69 |
| 6,062,742 A | * 5/2000 | Yuuki | 385/88 |
| 6,554,488 B2 | * 4/2003 | Asada | 385/85 |

* cited by examiner

*Primary Examiner*—Hemang Sanghavi
*Assistant Examiner*—Scott A Knauss
(74) *Attorney, Agent, or Firm*—Martin A. Farber

(57) ABSTRACT

A plug connector for an optical waveguide (5), which has a sheathed, light-conducting core (1) and an outer cladding (3) which surrounds the core sheathing (2), having a plug part (6), which can be plugged together with a mating plug part (7), the plug part (6) forming a tube (8) for insertion of the core (1), which can be severed flush with the tube end (9), and the mating plug part (7) forming a shaft (10) for insertion of the tube (8), which shaft (10) at the foot side is directed toward a transmitting/receiving element (11). It is of relevance that the plug part (6) is of two-part configuration, having a retaining part (12), which includes the tube (8) and holding parts (13, 14) for the core sheathing (2) and also the outer cladding (3), and a cap part (15), which can be clipped in a watertight manner to the retaining part (12) and has a passage opening for the optical waveguide (5).

10 Claims, 1 Drawing Sheet

PLUG CONNECTION FOR OPTICAL WAVEGUIDES

FIELD AND BACKGROUND OF THE INVENTION

The invention relates to a plug connector for an optical waveguide, which has a sheathed, light-conducting core and an outer cladding which surrounds the core sheathing, having a plug part, which can be plugged together with a mating plug part, the plug part forming a tube for insertion of the core, which can be severed flush with the tube end, and the mating plug part forming a shaft for insertion of the tube, which shaft at the foot side is directed toward a transmitting/receiving element.

A plug connector of this type forms part of the prior art. However, the known plug connector is not waterproof. To make a plug connector of this type watertight, DE 100 09 845, which is not a prior publication, proposes fitting an O-ring seal inside the plug part, which is to fit in a sealing manner around the core sheathing.

SUMMARY OF THE INVENTION

The invention is based on the object of making the plug connector which is known from the prior art watertight.

The invention provides that the plug part is of two-part configuration, having a retaining part, which includes the tube and holding means for the core sheathing and also the outer cladding, and a cap part, which can be connected in a watertight manner to the retaining part and has a passage opening for the optical waveguide. This configuration results in a plug part which is easy to produce and simple to connect to the optical waveguide. In a preferred refinement of the invention, it is provided that the holding means are threaded sections for the core sheathing and the outer cladding to be screwed into. To secure the optical waveguide to the plug part, it is necessary to uncover the optical waveguide or the core sheathing in certain regions. Then, after the cap part has been pushed over the optical waveguide, that section of the optical waveguide from which the insulation has been removed in this manner is plugged into the rear opening in the plug part until the end edge of the core sheathing or the end edge of the outer cladding comes into contact with the threaded section. Relative rotation of the plug part with respect to the optical waveguide then causes those sections of core sheathing and of the outer cladding from which the insulation has been removed to be screwed into the associated internal screw thread of the plug part. In a preferred configuration, although the threaded sections inside the cavity of the plug part have different diameters, they have the same thread pitch. The result of this is that the core sheathing and the outer cladding can be screwed simultaneously into the associated screw threads. The threaded section which holds the core sheathing can be seated directly to the rear of the tube. In a preferred refinement, it is provided that the at least one section of the threaded section which holds the core sheathing is associated with a flange having a funnel-shaped opening. This flange projects above the base of the cavity which is associated with the threaded section holding the outer cladding. This cavity has a rear end, into which the optical waveguide can be plugged and which is in the form of an inner-cone section. The cap part which closes off this opening can be clipped to the retaining part. The tube into which the optical waveguide is plugged is surrounded by a tube projection which has an outwardly facing annular bead. This tube projection is plugged into an annular slot in the mating plug part. The annular slot surrounds a core which is formed by a pedestal which forms the shaft into which the tube is plugged. The radially outer boundary of this annular slot is formed by a snap-action rim which engages over the bead in a watertight manner. The snap-action rim itself is formed by a soft plastic sleeve which is integrated in a watertight manner in the mating plug part.

The invention also relates to the plug part of the plug connector.

BRIEF DESCRIPTION OF THE DRAWING

An exemplary embodiment of the invention is explained below with reference to appended drawing.

DETAILED DESCRIPTION OF THE PREFERRED EMBODIMENT

Figure 1:
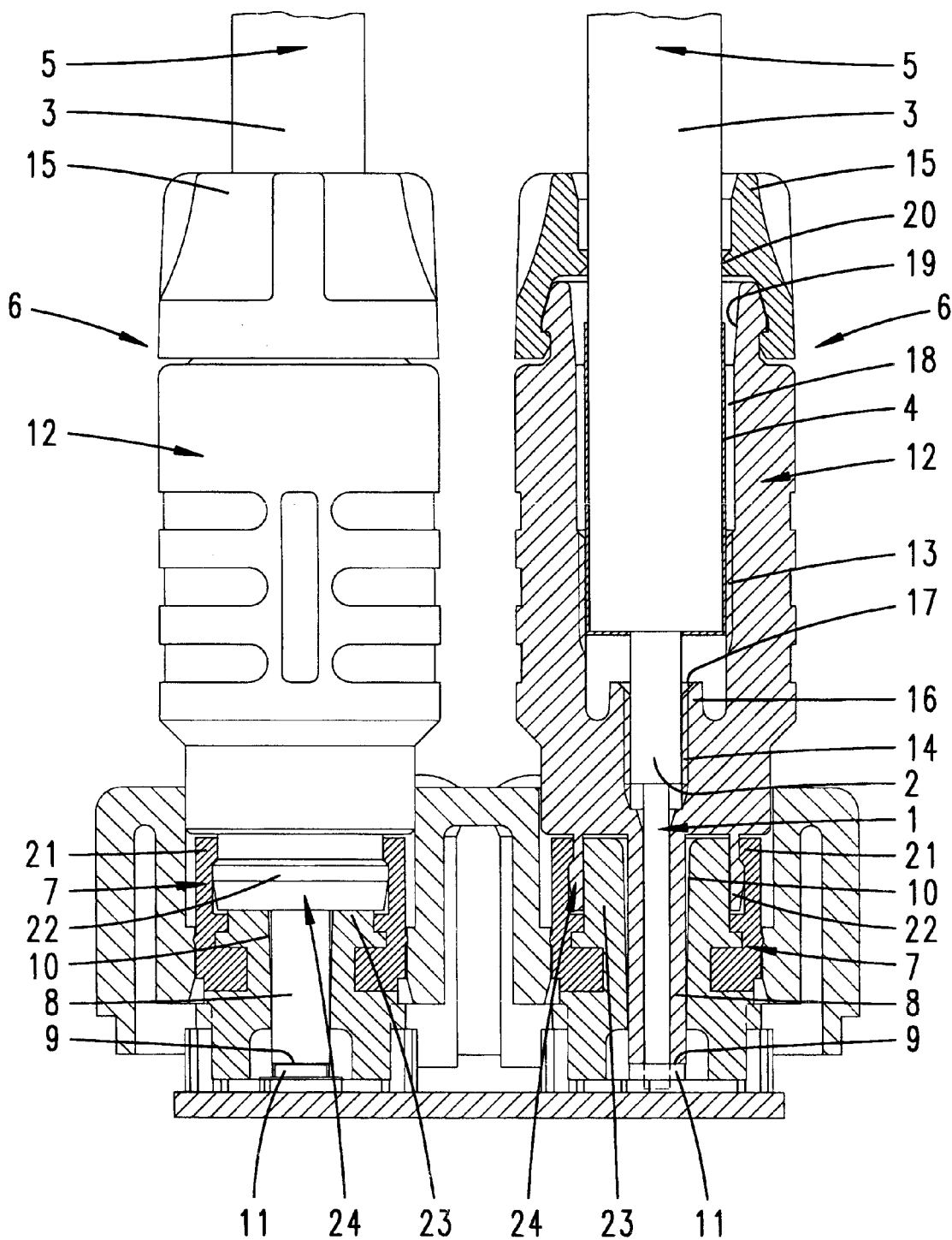

The left-hand part of FIG. 1 shows the plug part which has been plugged into the mating plug part, with the mating plug part illustrated in section, while the right-hand part of FIG. 1. shows the plug part plugged into the mating plug part, with the plug part illustrated in section.

The optical waveguide 5 has a core 1 which is made from a material which conducts light waves. The core 1 is surrounded by a core sheathing 2. This core sheathing 2 may consist of plastics. The core sheathing 2 is surrounded by tension-relieving fibers 4. The outer cladding 3 surrounds the latter.

The plug part 6 is of two-part form. It comprises only a retaining part 12 and a cap part 15 which closes off the rear opening of the retaining part 12. Cap part 15 and retaining part 12 are formed as injection moldings.

On the plug-in side, the retaining part 12 has a tube 8 in which the core 1 lies, so that its end projects beyond the tube end 9. It can then be cut off flush with the tube end 9. The tube 8, which comes out of the front end face of the retaining part 12, is coaxially surrounded by a tube projection 24. This tube projection 24, which is joined integrally in terms of materials to the tube 8, has an outwardly projecting bead 22.

At its end, the tube 8 widens toward the plug interior to form an internal screw thread 14, into which the core sheathing 2 can be screwed. The internal screw thread 14 is in certain regions associated with a flange 16 which originates from the base of the inner cavity of the retaining part 12. To facilitate introduction of the core sheathing 2 into the screw thread 14, the threaded section 14 opens out in the shape of a funnel 17.

The cavity has a second screw thread 13 of larger diameter. This threaded section 13 is used for the outer cladding 3, around which the tension-relief fibers have been laid toward the rear, to be screwed into it.

To make it easier to introduce the outer cladding 3, the opening of the cavity 18 has a conical rim section 19. In the region of the conical rim section 19, the retaining part 12 forms an annular bead which projects radially outward and over which a snap-action rim of the cap part 15 can be clipped. The cap part 15 has inner sealing lips 20, which bear in a sealing manner against the outer cladding 3.

The cap part 5 closes off the cavity 18 in a watertight manner.

The tube 8 is plugged into the shaft 10 of a pedestal 23 of the mating plug part 7. The tube end 9 in the process comes to bear in contact or almost in contact with a transmitting/receiving element 11 which is associated with the base of the shaft 10. When the plug part 6 is plugged into the mating plug part 7, the tube projection 24 passes into the annular slot between pedestal 23 and snap-action rim 21, so that the snap-action rim 21 can engage over the radially outwardly projecting bead 22 of the tube projection 24 in a watertight manner.

The plug part 6 is assembled as a result of, first of all, the cap part 15 being pushed over the outer cladding 3. Then, the core 1 and the core sheathing 2 are uncovered in steps. The tension relief fibers 4 are placed over the outer cladding 3 toward the rear. Then, that end of the optical waveguide from which the insulation has been removed is plugged into the cavity 18. In the process, the core 1 slides into the tube 8. Relative rotation of the plug part 6 with respect to the optical waveguide 5 causes the core sheathing 2 to be screwed into the internal screw thread 14 and, at the same time, causes the outer cladding 3 to be screwed into the internally threaded section 13 until the end of the core 1 projects beyond the tube end 9. Then, the cap part is pushed over the bead of the retaining part 12, and the projecting end of the core 1 is cut off flush with the tube end 9.

We claim:

1. A plug connector for an optical waveguide (5), which has a sheathed, light-conducting core (1) and an outer cladding (3) which surrounds a core sheathing (2), having a plug part (6), is plugable together with a mating plug part (7), the plug part (6) forming a tube (8) for insertion of the core (1), which is severable flush with the tube end (9), and the mating plug part (7) forming a shaft (10) for insertion of the tube (8), which shaft (10) at a foot side is directed toward a transmitting/receiving element (11), wherein the plug part (6) is of two-part configuration, having a retaining part (12), which includes the tube (8) and holding means (13, 14) for the core sheathing (2) and also the outer cladding (3), and a cap part (15), which is clipable in a watertight manner to the retaining part (12) and has a passage opening for the optical waveguide (5).

2. The plug connector according to claim 1, wherein the holding means (13, 14) are threaded sections for the core sheathing (2) and the outer cladding (3) to be screwed into.

3. The plug connector according to claim 1, wherein a sealing lip, which bears in a watertight manner against the outer cladding (3), is associated with the passage opening in the cap part (15).

4. The plug connector according to claim 2, wherein the threaded sections (13, 14) have different diameters but the same thread pitch.

5. The plug connector according to claim 2, wherein the threaded section (14) which holds the core sheathing (2) is located immediately rear of the tube (8).

6. The plug connector according to claim 2, wherein at least one section of the threaded section (14) which holds the core sheathing (2) is associated with a flange (16) with a funnel-shaped opening, which flange projects above a base of a cavity (18) associated with the threaded section (13) which holds the outer cladding (3).

7. The plug connector according to claim 6, further comprising an inner-cone section (19) which is associated with the opening of the cavity (18).

8. The plug connector according to claim 1, wherein the cap part (15) is clipped to the retaining part (12).

9. The plug connector according to claim 1, wherein the retaining part (12) and cap part (15) are each plastic injection moldings.

10. Plug (6) of a plug connection for an optical waveguide, which includes a sheathed, light-conducting core (1) and an outer cladding (3) which surrounds a core sheathing, the plug part (6) forming a tube (8) for insertion of the core (1), which is severable flush with tube end (9), wherein the plug part (6) is of two-part configuration, having a retaining part (12), which includes the tube (8) and holding means (13, 14) for the core sheathing (2) and also the outer cladding (3), and a cap part (15), which is connectable in a watertight manner to the retaining part and has a passage opening for the optical waveguide (5), in particular having the features of claim 1.

* * * * *

UNITED STATES PATENT AND TRADEMARK OFFICE
Certificate

Patent No. 6,652,157 B2                                                    Patented: November 25, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Werner Schmidt, Halver (DE); Jürgen Bohn, Lüdenscheid (DE); Thorsten Bunte, Gütersloh (DE); and Franz-Josef Kucharski, Gütersloh (DE).

Signed and Sealed this Twelfth Day of February 2013.

*UYEN-CHAU N. LE*
*Supervisory Patent Examiner*
*Art Unit 2874*
*Technology Center 2800*